US010245996B1

(12) United States Patent
Wanke

(10) Patent No.: US 10,245,996 B1
(45) Date of Patent: Apr. 2, 2019

(54) BOAT TRAILER

(71) Applicant: Matthew T. Wanke, Elkhart, IN (US)

(72) Inventor: Matthew T. Wanke, Elkhart, IN (US)

( * ) Notice: Subject to any disclaimer, the term of this patent is extended or adjusted under 35 U.S.C. 154(b) by 163 days.

(21) Appl. No.: 15/633,607

(22) Filed: Jun. 26, 2017

(51) Int. Cl.

| | |
|---|---|
| ***B60P 3/10*** | (2006.01) |
| ***B62D 63/08*** | (2006.01) |
| ***B60P 3/00*** | (2006.01) |
| *B62D 63/06* | (2006.01) |

(52) U.S. Cl.
CPC ............... *B60P 3/1066* (2013.01); *B60P 3/00* (2013.01); *B62D 63/08* (2013.01); *B60P 3/10* (2013.01); *B62D 63/06* (2013.01)

(58) Field of Classification Search
CPC .............. B60P 3/08; B60P 3/10; B60P 3/1033
See application file for complete search history.

(56) References Cited

U.S. PATENT DOCUMENTS

| | | | | |
|---|---|---|---|---|
| 3,718,227 A * | 2/1973 | Swift | B60P 3/1033 | 410/25 |
| 3,870,339 A * | 3/1975 | Goff | B60P 3/1033 | 280/414.1 |
| 4,406,477 A * | 9/1983 | McDonald | B60P 3/1033 | 280/414.1 |
| 4,589,814 A * | 5/1986 | Cates | B60P 3/1033 | 280/414.1 |
| 4,705,289 A * | 11/1987 | Weber | B60P 3/1033 | 280/414.1 |
| 4,880,250 A * | 11/1989 | Cravens | B60P 3/08 | 280/414.1 |
| 4,932,830 A * | 6/1990 | Woodburn | B60P 3/08 | 280/414.1 |
| 5,704,756 A * | 1/1998 | Marteney | B60P 1/02 | 414/462 |
| 6,027,290 A * | 2/2000 | Andre | B60P 1/02 | 187/215 |
| 6,485,237 B1 * | 11/2002 | Sandwith | B60P 3/08 | 410/24 |

* cited by examiner

*Primary Examiner* — Kevin Hurley
(74) *Attorney, Agent, or Firm* — Gulf Coast Intellectual Property Group

(57) ABSTRACT

A boat trailer configured to provide the coordinated hauling of a plurality of boats having associated trailers. The boat trailer includes a lower platform and an upper platform that are operably coupled by a plurality of support members. The plurality of support members are operable to provide height adjustment intermediate the upper platform and lower platform so as to accommodate loads of different sizes. The upper platform and lower platform include opposing longitudinal support members having opposing end members perpendicular thereto at opposite ends of the longitudinal support members. The upper platform and lower platform include at least two track members intermediate the opposing longitudinal support members. The track members further include grooves extending the length thereof. A removable support member is provided that is configured to be suspendedly mounted to the track members. The support members include an upper portion and a lower portion slidably coupled.

20 Claims, 4 Drawing Sheets

BOAT TRAILER

PRIORITY UNDER 35 U.S.C Section 119(e) & 37 C.F.R. Section 1.78

This nonprovisional application claims priority based upon the following prior United States Provisional Patent Application entitled: Multiple Boat Hauling Trailer, Application No. 62/355,069 filed Jun. 27, 2016, in the name of Matthew T. Wanke, which is hereby incorporated by reference for all purposes.

FIELD OF THE INVENTION

The present invention relates generally to transportation apparatus, more specifically but not by way of limitation, a boat hauling trailer that is configured to accommodate a plurality of trailerable boats wherein the present invention is configured to possess expandable spacing and configurations so as to accommodate various watercraft.

BACKGROUND

Millions of watercraft are manufactured every year and transported to various distribution centers and dealerships for sale. Additionally, companies and private owners will ship water vessels to various locations either during a permanent relocation or for temporary relocation of the water vessel. As is known in the art, watercraft are manufactured in numerous sizes and shapes. Watercraft are manufactured having different beam widths and further many watercraft include features such as but not limited to windshields and hardtops. The aforementioned features and characteristics present challenges during when transporting watercraft. While some watercraft are transported via their own custom built trailer, many watercraft are shipped with other watercraft together on large trailer assemblies.

Existing boat hauling trailers typically comprise a single platform configured to have a boat or a plurality of boats superposed thereon. The conventional single platforms of existing boat hauling trailers require either the stacking of boats or can sometimes only accommodate a single watercraft.

Accordingly, there is a need for a boat hauling trailer that includes receiving areas wherein the receiving areas are configurable in alternate manners so as to facilitate the accommodation of a plurality of watercraft onto the boat hauling trailer.

SUMMARY OF THE INVENTION

It is the object of the present invention to provide a boat hauling trailer configured to accommodate a plurality of watercraft and their associated trailer that includes a lower support platform.

Another object of the present invention is to provide a boat hauling trailer operable to transport a plurality of boats with trailers that further includes an upper support platform.

A further object of the present invention is to provide a boat hauling trailer configured to receive, store and transport a plurality of boats wherein the lower platform is configured with longitudinal tracks.

Still another object of the present invention is to provide a boat hauling trailer that is configured to be expandable with an upper support platform wherein the upper support platform further includes longitudinal support tracks extending the length thereof.

An additional object of the present invention is to provide a boat hauling trailer that is operable to be configurable so as to accommodate alternate size watercraft that further includes a plurality of support members.

Yet a further object of the present invention is to provide a boat hauling trailer configurable to accommodate a plurality of boats wherein the plurality of support members are configured to support the upper support platform above the lower support platform.

Another object of the present invention is to provide a boat hauling trailer operable to receive and transport a plurality of watercraft and their associated trailers wherein the upper support platform further includes a perimeter frame having pocket members configured to engage the plurality of support members.

An alternative object of the present invention is to provide a boat hauling trailer configured to receive and transport a plurality of watercraft and their associated trailers that further includes a removable support member configured to be releasably secured within the longitudinal tracks of the upper support platform.

An additional object of the present invention is to provide a boat hauling trailer that is configured to transport a plurality of boats wherein the height intermediate the lower support platform and upper support platform is adjustable.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
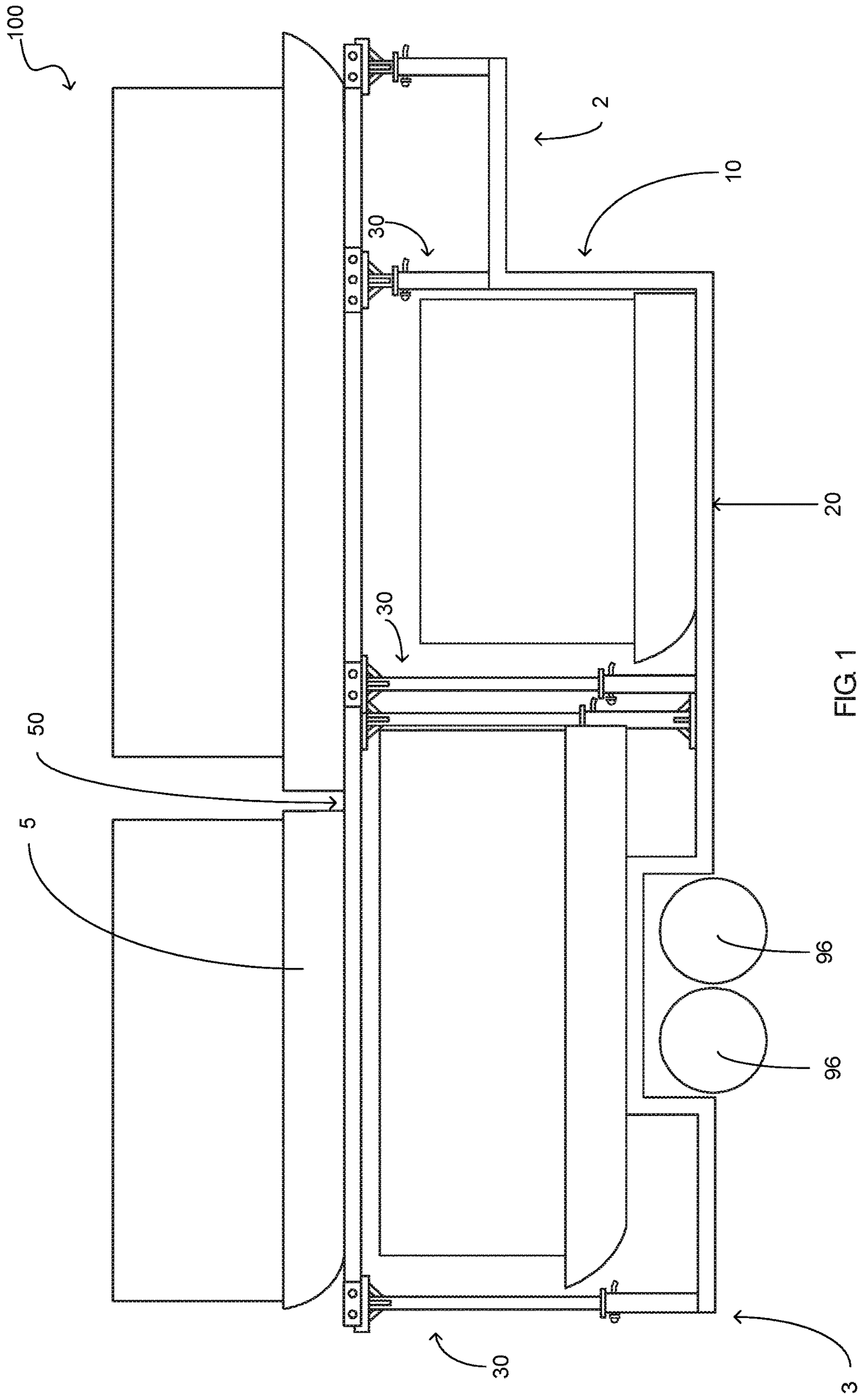
FIG. 1 is a side diagrammatic view of an embodiment of the present invention.

Referring now to the drawings submitted herewith, wherein various elements depicted therein are not necessarily drawn to scale and wherein through the views and figures like elements are referenced with identical reference numerals, there is illustrated a boat trailer 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted herewith the boat trailer 100 further includes a frame 10. The frame 10 includes a lower support platform 20, an upper support platform 50 and a plurality of support members 30 intermediate thereof configured to adapt the distance intermediate the lower support platform 20 and upper support platform 50. The frame 10 is manufactured from suitable durable materials such as but not limited to metal and is further constructed utilizing durable techniques such as but not limited to welding or mechanical fasteners.

Figure 4:
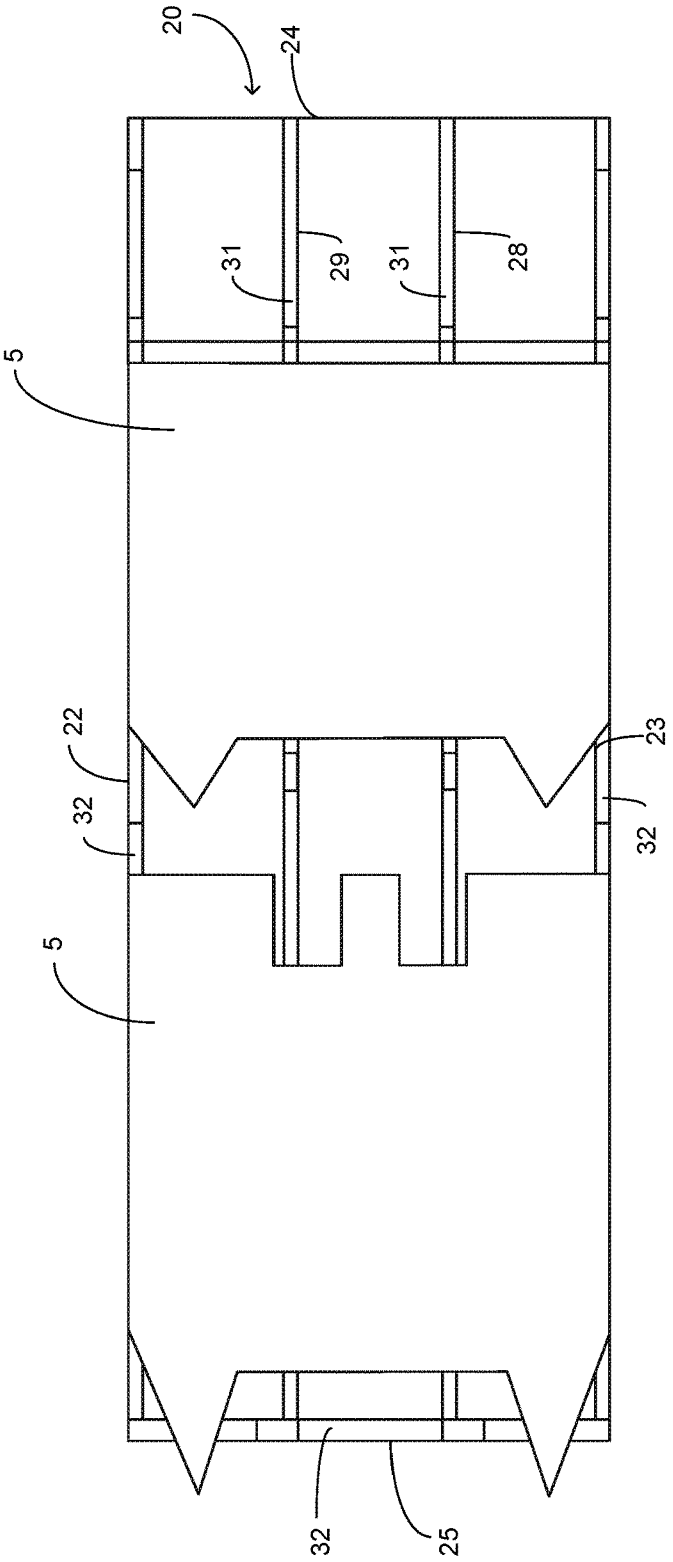
FIG. 4 is a top view of the lower support platform of the present invention.
Figure 5:
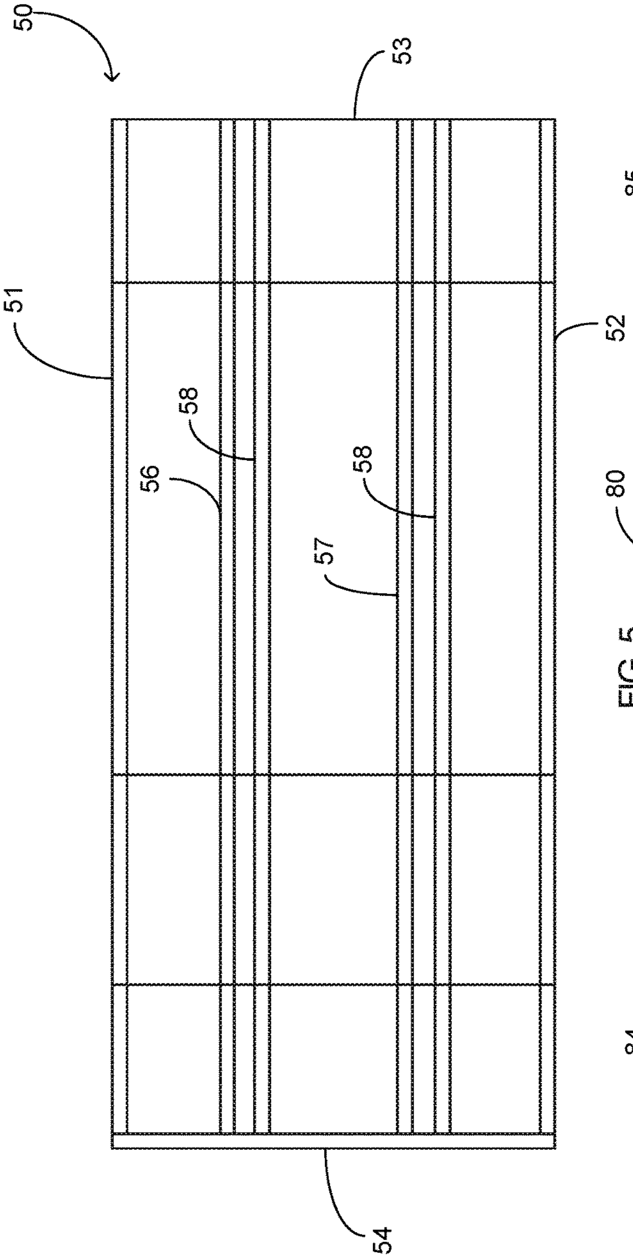
FIG. 5 is a top view of the upper support platform of the present invention.
Figure 6:
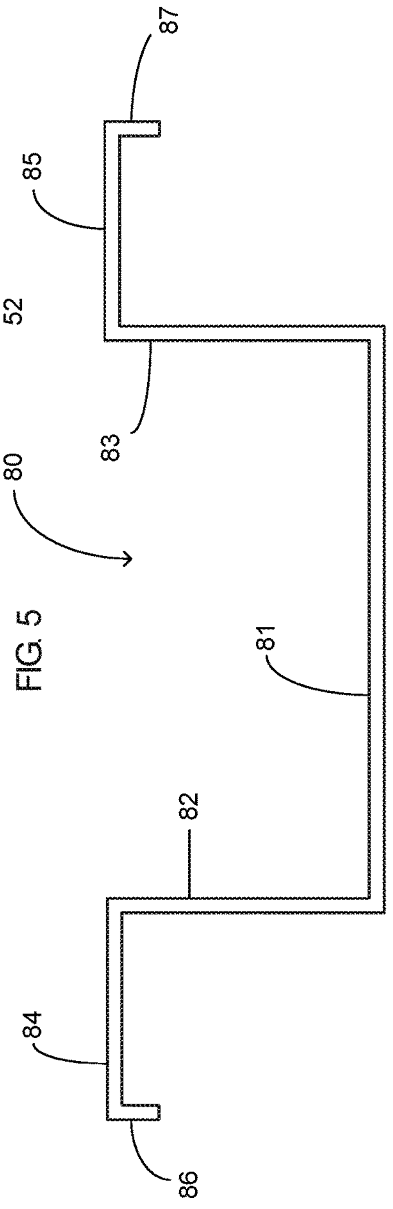
FIG. 6 is a front view of the removable support member of the present invention.

Referring in particular to FIG. 4 and FIG. 5 herein, the lower support platform 20 and upper support platform 50 are illustrated therein. The lower support platform 20 is generally rectangular in shape having an outer frame member 21 forming the perimeter edge thereof. The lower support platform includes opposing longitudinal support members 22,23 that are parallel. Further comprising the lower support platform member 20 are end support members 24,25. The end support members 24,25 are coupled intermediate the opposing longitudinal support members 22, 23. The end support members 24,25 are perpendicular oriented with the longitudinal support members 22,23 and coupled at distal ends thereof. The end support members 24,25 and opposing longitudinal support members 22,23 are coupled utilizing suitable durable techniques such as but not limited to welding and/or mechanical fasteners. The lower support platform 20 further includes a first track member 28 and second track member 29. The first track member 28 and second track member 29 are intermediate opposing longitudinal support members 22, 23 and extend the length of the lower support platform 20. The first track member 28 and second track member 29 include groove 31 that is configured to receive therein a trailer tire for a watercraft trailer. It is contemplated within the scope of the present invention that the first track member 28 and second track member 29 could be movably secured to the end support members 24,25 so as to provide adjustability of the width intermediate the first track member 28 and second track member 29. It is further contemplated within the scope of the present invention that the lower support platform 20 could include more than two track members so as to accommodate alternate types of trailers and/or tongue wheel-stands of conventional boat trailers. The opposing longitudinal support members 22,23 and the end support member 25 are further configured to have void 32. Void 32 is operable to receive a portion of the plurality of support members 30 as will be further discussed herein.

Referring now to FIG. 5 herein, a top view of the upper support platform 50 is illustrated therein. The upper support platform 50 includes opposing longitudinal support members 51,52 and end support members 53,54 operably coupled to form a rectangular shape. The upper support platform 50 is manufactured from a suitable durable material such as but not limited to metal and the opposing longitudinal support members 51,52 and end support members 53, 54 are secured utilizing durable techniques such as but not limited to welding and/or mechanical fasteners. The opposing longitudinal support members 51,52 and end support member 54 include void 55 configured to engage a portion of the plurality of support members 30 as will be further discussed herein. The upper support platform 50 includes a first track member 56 and second track member 57. The first track member 56 and second track member 57 extend intermediate the end support members 53, 54 and are secured thereto utilizing suitable durable techniques. It is contemplated within the scope of the present invention that the first track member 56 and second track member 57 could be movably mounted so as to provide the ability to adjust the distance therebetween. It should be understood within the scope of the present invention that the upper support platform 50 could have more than two track members.

Figure 3:
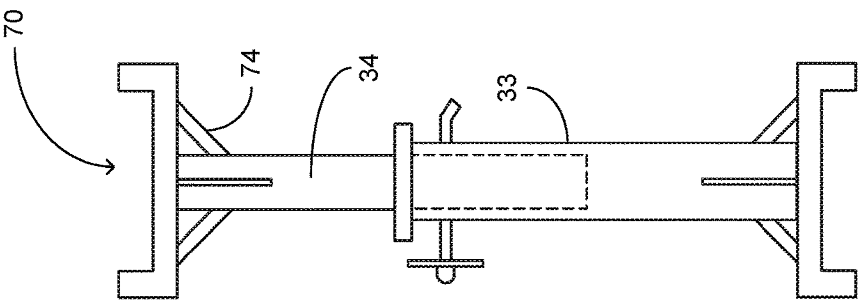
FIG. 3 is a front view of the support member of the present invention.
Figure 2:
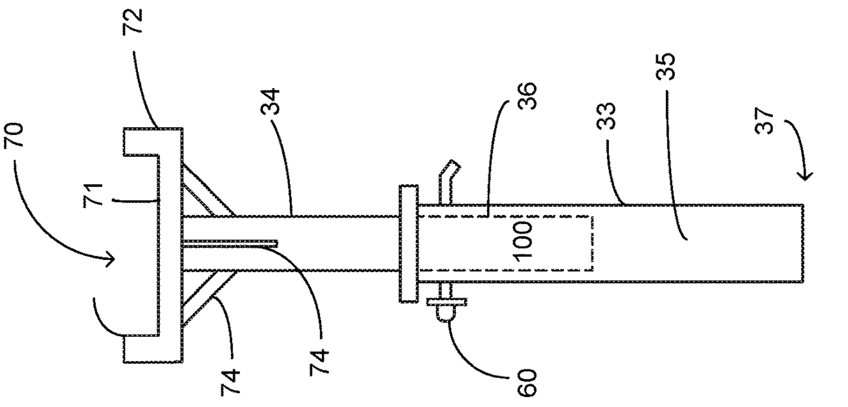
FIG. 2 is a side view of the support member of the present invention.

Referring now to FIG. 2 and FIG. 3 herein, the support member 30 of the present invention is illustrated therein. The support members 30 include lower portion 33 and upper portion 34. The lower portion 33 includes hollow passage 35 operable to receive a portion of the shank 36 of the upper portion 34. The shank 36 is slidably coupled with lower portion 33 so as to provide height adjustment of the support members 30. It should be understood within the scope of the present invention that the support members 30 are manufactured in alternate lengths depending upon the position of the boat trailer in which the support members are placed. As is shown herein in FIG. 1, the support members 30 proximate the front 2 of the boat trailer 100 do not require the same length as the support members 30 proximate the rear 3 of the boat trailer 100. Support members 30 are adjusted as needed to accommodate exemplary boats 5 having different height requirements. Shank 36 includes a plurality of apertures (not illustrated herein) that are configured to align with apertures (not illustrated herein) bored through lower portion 35. A pin 60 is present and operable to be journaled through the aforementioned apertures so as to provide a fixed position of the upper portion 34. The end 37 of the lower portion 33 is sized so as to be secured within voids 32 wherein the lower portion 33 is journaled into void 32 and secured utilizing suitable durable techniques.

The upper portion 34 includes support mount 70. Support mount 70 includes members 71,72 and 73 integrally formed to create a square u-shape for the support mount 70. The square u-shape of the support mount provides an improved engagement with the track members referenced herein. Track members are positioned so as to be superposed member 71 and surrounded by members 72,73 for securing thereof. The support member 30 is further designed to engage the end members and opposing longitudinal side members in the same manner. Support mount 70 is secured to upper portion 34 utilizing suitable durable techniques and brackets 74 are further provided to provide connection thereto.

Illustrated herein in FIG. 7 is a removable support member 80. Removable support member 80 is formed to be removably secured to the track members referenced herein. Removable support member 80 is mounted to boat trailer 100 wherein members 84,85 are superposed track members so as to suspendedly secure removable support member 80. The removable support member 80 includes base member 81 that is horizontal in manner. Coupled to base member 81 on opposing ends thereof are vertical support members 82,83. The vertical support members 82,83 extend upward from the base member 81 and are secured thereto utilizing suitable durable techniques. Member 85 is secured to member 83 and extends perpendicularly outward therefrom. Opposite thereto, member 84 extends perpendicularly outward from vertical support member 82. A first lateral support member 87 extends perpendicularly downward from member 85. A second lateral support member 86 is secured to member 84 and is configured to extend downward therefrom and be perpendicular thereto. It should be understood within the scope of the present invention that the removable support member 80 could be manufactured in alternate widths and lengths so as to accommodate a variety of load configurations.

It should be understood by those skilled in the art that the boat trailer 100 includes conventional wheels 96 operably coupled by axles (not illustrated herein). Furthermore, it should be understood by those skilled in the art that various configuration of wheels 96 and axles could be utilized such as but not limited to the tandem configuration illustrated herein.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A boat trailer configured to transport a plurality of boats comprising:

a lower platform, said lower platform having opposing longitudinal support members, said lower platform further including opposing end members, said end members being perpendicularly secured to said opposing longitudinal support members, said end members being located at opposite ends of said opposing longitudinal support members, said lower platform further including at least two track members, said at least two track members being mounted to said opposing end members;

an upper platform, said upper platform having opposing longitudinal support members, said opposing longitudinal support members being parallel in configuration, said upper platform having opposing end support members, said opposing end support members being perpendicular to said opposing longitudinal support members, said opposing end support members being secured at opposite ends of said opposing longitudinal support members;

a plurality of support members, said plurality of support members operable to secure the upper platform to said lower platform, said plurality of support members extending upward from said lower support platform, said plurality of support members being adjustable in height; and wherein the plurality of support members function to provide alternate heights of the upper platform relative to the lower platform so as to accommodate objects superposed the lower platform.

2. The boat trailer as recited in claim 1, wherein said lower platform further includes at least two track members, said at least two track members extending the length of said lower platform, said at least two track members coupled to said lower platform further including a groove.

3. The boat trailer as recited in claim 2, wherein said plurality of support members further include a lower portion and an upper portion, said upper portion being configured to be slidably received by said lower portion.

4. The boat trailer as recited in claim 3, wherein said upper portion of said plurality of support members further includes a mounting member, said mounting member configured to at least partially surround the at least two track members of the upper platform.

5. The boat trailer as recited in claim 4, and further including a removable support member, said removable support member being configured to be suspendedly mounted to said at least two track members of said upper platform.

6. The boat trailer as recited in claim 5, wherein said opposing longitudinal support members of said lower platform further include a void, said void configured to receive a portion of said lower portion of said plurality of support members.

7. The boat trailer as recited in claim 6, wherein said plurality of support members further include a pin, said pin being configured to be journaled through said upper portion and said lower portion of said plurality of support members, said pin operable to provide height adjustment of said plurality of support members.

8. A boat trailer configured to transport a plurality of boats having associated trailers wherein the boat trailer is configurable comprising:

a lower platform, said lower platform being rectangular in shape, said lower platform having opposing longitudinal support members, said opposing longitudinal support members being parallel in manner, said lower platform further including opposing end members, said end members being perpendicularly secured to said opposing longitudinal support members at opposite ends thereof, said lower platform further including at least two track members, said at least two track members being mounted to said opposing end members, said at least two track members being intermediate said opposing longitudinal support members;

an upper platform, said upper platform being rectangular in shape, said upper platform having opposing longitudinal support members, said opposing longitudinal support members of said upper platform being parallel in configuration, said upper platform having opposing end support members, said opposing end support members of said upper platform being perpendicular to said opposing longitudinal support members of said upper platform, said opposing end support members of said upper platform being secured at opposite ends of said opposing longitudinal support members of said upper platform, said upper platform having at least two track members, said at least two track members of said upper platform being intermediate said opposing longitudinal support members of said upper platform;

a plurality of support members, said plurality of support members operable to secure the upper platform to said lower platform, said plurality of support members extending upward from said lower support platform, said plurality of support members being adjustable in height, said plurality of support members having a lower portion and an upper portion, said upper portion configured to be slidably engaged with said lower portion; and wherein the plurality of support members function to provide alternate heights of the upper platform relative to the lower platform so as to accommodate objects superposed the lower platform.

9. The boat trailer as recited in claim 8, wherein said opposing longitudinal support members of said lower platform further include a void configured to operably engage said plurality of support members.

10. The boat trailer as recited in claim 9, wherein said at least two track members of said upper platform further include grooves, said grooves extending the length of said at least two track members of said upper platform.

11. The boat trailer as recited in claim 10, wherein said plurality of support members further include a support mount, said support mount being secured to said upper portion of said plurality of support members, said support mount being square u-shaped.

12. The boat trailer as recited in claim 11, wherein said at least two track members of said lower platform further include grooves, said grooves extending the length of said at least two track members of said lower platform.

13. The boat trailer as recited in claim 12, wherein said support mounts further include brackets secured thereto, said brackets being angularly coupled intermediate said support mounts and said upper portion of said plurality of support members.

14. The boat trailer as recited in claim 13, and further including a removable support member, said removable support member including a horizontal base member having a first side and a second side, said removable support member further including vertical support members extending upward from said horizontal base member on opposing sides thereof.

15. A boat trailer configured to transport a plurality of boats having associated trailers wherein the boat trailer is configurable comprising:

a lower platform, said lower platform being rectangular in shape, said lower platform having opposing longitudinal support members, said opposing longitudinal support members being parallel in manner, said lower platform further including opposing end members, said end members being perpendicularly secured to said opposing longitudinal support members at opposite ends thereof, said lower platform further including at least two track members, said at least two track members being mounted to said opposing end members, said at least two track members being intermediate said opposing longitudinal support members, wherein said opposing longitudinal support members of said lower platform further include a void configured to operably engage said plurality of support members;

an upper platform, said upper platform being rectangular in shape, said upper platform having opposing longitudinal support members, said opposing longitudinal support members of said upper platform being parallel in configuration, said upper platform having opposing end support members, said opposing end support members of said upper platform being perpendicular to said opposing longitudinal support members of said upper platform, said opposing end support members of said upper platform being secured at opposite ends of said opposing longitudinal support members of said upper platform, said upper platform having at least two track members, said at least two track members of said upper platform being intermediate said opposing longitudinal support members of said upper platform;

a plurality of support members, said plurality of support members operable to secure the upper platform to said lower platform, said plurality of support members extending upward from said lower support platform, said plurality of support members being adjustable in height, said plurality of support members having a lower portion and an upper portion, said upper portion configured to be slidably engaged with said lower portion, wherein said plurality of support members further include a support mount, said support mount being secured to said upper portion of said plurality of support members, said support mount being square u-shaped;

a removable support member, said removable support member including a horizontal base member having a first side and a second side, said removable support member further including vertical support members extending upward from said horizontal base member on opposing sides thereof; and wherein the plurality of support members function to provide alternate heights of the upper platform relative to the lower platform so as to accommodate objects superposed the lower platform.

16. The boat trailer as recited in claim 15, wherein said support mounts further include brackets secured thereto, said brackets being angularly coupled intermediate said support mounts and said upper portion of said plurality of support members.

17. The boat trailer as recited in claim 16, wherein said at least two track members of said lower platform further include grooves, said grooves extending the length of said at least two track members of said lower platform.

18. The boat trailer as recited in claim 17, wherein said at least two track members of said upper platform further include grooves, said grooves extending the length of said at least two track members of said upper platform.

19. The boat trailer as recited in claim 18, wherein each of said vertical support members include a member extending outward therefrom, wherein the member is distally located on said vertical support members from said horizontal base member.

20. The boat trailer as recited in claim 19, wherein said plurality of support members further include a pin, said pin being configured to be journaled through said upper portion and said lower portion of said plurality of support members, said pin operable to provide height adjustment of said plurality of support members.

* * * * *